US006681173B2

(12) United States Patent
Turner et al.

(10) Patent No.: US 6,681,173 B2
(45) Date of Patent: Jan. 20, 2004

(54) METHOD AND SYSTEM FOR DETERMINING ANGULAR CRANKSHAFT POSITION PRIOR TO A CRANKING EVENT

(75) Inventors: Steven Richard Turner, Carmel, IN (US); Charles M. Grimm, Carmel, IN (US); Michael J Nickels, Sharpsville, IN (US); Brian John Denta, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 123 days.

(21) Appl. No.: 10/098,799

(22) Filed: Mar. 15, 2002

(65) Prior Publication Data

US 2003/0176964 A1 Sep. 18, 2003

(51) Int. Cl.[7] ......................... G06F 19/00; G01M 15/00
(52) U.S. Cl. ....................... 701/113; 701/115; 73/117.3
(58) Field of Search ................................ 701/101, 102, 701/103, 113, 115, 35; 73/116, 117.2, 117.3; 123/179.4, 179.5, 406.61, 406.62, 476, 612, 613, 617; 318/446, 445, 478

(56) References Cited

U.S. PATENT DOCUMENTS 5,311,430 A * 5/1994 Ishigami ...................... 701/35
5,353,635 A * 10/1994 Saiki et al. ................ 73/117.2
5,548,995 A * 8/1996 Clinton et al. ................ 73/116
5,604,304 A * 2/1997 Kokubo et al. ............ 73/117.3
6,098,585 A * 8/2000 Brehob et al. ........... 123/179.5
6,218,799 B1 * 4/2001 Hori ........................... 318/446
6,499,342 B1 * 12/2002 Gonzales, Jr. ............. 73/117.3

* cited by examiner

*Primary Examiner*—Willis R. Wolfe
(74) *Attorney, Agent, or Firm*—Jimmy L. Funke

(57) ABSTRACT

Method, control system and computer-readable medium are respectively provided for determining angular crankshaft position prior to a cranking event of an internal combustion engine. Upon issuance of an engine shutdown command, the method allows determining an initial crankshaft position based on a crankshaft position sensor. The method further allows providing a rulebase for relating angular travel of a rotor in an accessory device to crankshaft angular travel. Angular travel of the rotor in the accessory device is sensed since issuance of the engine shutdown command until the engine reaches a resting position. The rulebase is accessed to relate the value of the angular travel of the rotor in the accessory device to crankshaft angular travel and provide an incremental crankshaft angular travel relative to the initial crankshaft position at engine shutdown. Crankshaft position is calculated at the resting position based upon the initial crankshaft position plus the incremental crankshaft angular travel based on the angular travel of the rotor in the accessory device. The calculated crankshaft position corresponding to the resting position is stored. Upon issuance of an engine re-start command, the stored crankshaft position corresponding to the resting position is retrieved to provide quick and accurate engine control regardless of any dead-band in the crankshaft position sensor during low engine speeds.

9 Claims, 1 Drawing Sheet

METHOD AND SYSTEM FOR DETERMINING ANGULAR CRANKSHAFT POSITION PRIOR TO A CRANKING EVENT

BACKGROUND OF THE INVENTION

The present invention is generally related to control of internal combustion engines, and, more particularly to, control techniques and system for determining angular crankshaft position prior to a cranking event in the engine.

In internal combustion engines, such as those commonly used in automotive applications, that are controlled by an Engine Control Module (ECM), among other parameters, the ECM generally controls spark firing, and fuel flow to the cylinders of the engine. In order to provide spark firing at exactly the proper time and to the appropriate cylinders, crankshaft position sensors, such as inductive sensors, are provided to indicate to the ECM the angular position of the crankshaft of the engine. Unfortunately, the inductive sensors typically used in automotive applications may have a dead-band at low engine speeds and may only supply a useful signal until the engine speed is greater than a certain non-zero engine speed, typically at least 50 rpm or more. Thus, in a normal engine start, the starter motor begins a cranking event, and eventually accelerates the engine above 50 rpm, at which time the ECM is then able to determine which cylinders are on a compression stroke and should receive spark firing. The above-identified sensing scheme generally results in engine-start cranking times of typically one second or more.

In a land-based vehicle, such as an electric or hybrid electric vehicle that may be equipped with an Integrated Starter Generator (ISG) subsystem (also referred to as Start/Stop Generator (SSG) subsystem, as part of its propulsion drive system, it would be desirable to provide engine-start cranking times not subject to the starting limitations of existing crankshaft sensors. For readers who desire background information regarding innovative propulsion systems equipped with an ISG subsystem and having a relatively wide speed range, high torque per ampere, high efficiency, quick dynamic response, and operational robustness and reliability under tough environmental or operational conditions, or both, reference is made to U.S. patent application Ser. No. 09/928,613 filed Aug. 13, 2001; and Ser. No. 09/909,356 filed Jul. 19, 2001, commonly assigned to the assignee of the present invention, and herein incorporated by reference.

BRIEF SUMMARY OF THE INVENTION

Generally, the present invention fulfills the foregoing needs by providing in one aspect thereof a method for determining angular crankshaft position prior to a cranking event of an internal combustion engine. Upon issuance of an engine shutdown command, the method allows determining an initial crankshaft position based on a crankshaft position sensor. The method further allows providing a rulebase for relating angular travel of a rotor in an accessory device to crankshaft angular travel. Angular travel of the rotor in the accessory device is sensed upon issuance of the engine shutdown command until the engine reaches a resting position. The rulebase is accessed to relate the value of the angular travel of the rotor in the accessory device to crankshaft angular travel and provide an incremental crankshaft angular travel relative to the initial crankshaft position at engine shutdown. Crankshaft position is calculated at the resting position based upon the initial crankshaft position plus the incremental crankshaft angular travel based on the angular travel of the rotor in the accessory device. The calculated crankshaft position corresponding to the resting position is stored. Upon issuance of an engine re-start command, the stored crankshaft position corresponding to the resting position is retrieved to provide quick and accurate engine control regardless of any dead-band in the crankshaft position sensor during low engine speeds.

The present invention further fulfills the foregoing needs by providing in another aspect thereof, a control system for determining angular crankshaft position prior to a cranking event of an internal combustion engine. The controller includes a crankshaft position sensor configured to provide an initial crankshaft position upon issuance of an engine shutdown command. A rulebase is provided for relating angular travel of a rotor in an accessory device to crankshaft angular travel. A rotor position sensor, such as a Hall-effect or magneto-resistive sensor, is provided for sensing angular travel of the rotor in the accessory device upon issuance of the engine shutdown command until the engine reaches a resting position. A processor is configured to access the rulebase to relate the value of the angular travel of the rotor in the accessory device to crankshaft angular travel and provide an incremental crankshaft angular travel relative to the initial crankshaft position at engine shutdown. The processor is further configured to calculate crankshaft position at the resting position based upon the initial crankshaft position plus the incremental crankshaft angular travel based on the angular travel of the rotor in the accessory device. Memory allows storing the calculated crankshaft position corresponding to the resting position. An engine control module is configured to retrieve the stored crankshaft position corresponding to the resting position upon issuance of an engine re-start command, and provide quick and accurate engine control regardless of any dead-band in the crankshaft position sensor during low engine speeds.

In yet another aspect thereof, the present invention provides a computer-readable medium including instructions for causing a computer to determine angular crankshaft position prior to a cranking event of an internal combustion engine by: upon issuance of an engine shutdown command, determining an initial crankshaft position based on a crankshaft position sensor; sensing angular travel of a rotor in an accessory device upon issuance of the engine shutdown command until the engine reaches a resting position; accessing a rulebase configured to relate the value of the angular travel of the rotor in the accessory device to crankshaft angular travel and provide an incremental crankshaft angular travel relative to the initial crankshaft position at engine shutdown; calculating crankshaft position at the resting position based upon the initial crankshaft position plus the incremental crankshaft angular travel based on the angular travel of the rotor in the accessory device; storing the calculated crankshaft position corresponding to the resting position; and, upon issuance of an engine re-start command, retrieving the stored crankshaft position corresponding to the resting position and provide quick and accurate engine control regardless of any dead-band in the crankshaft position sensor during low engine speeds.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
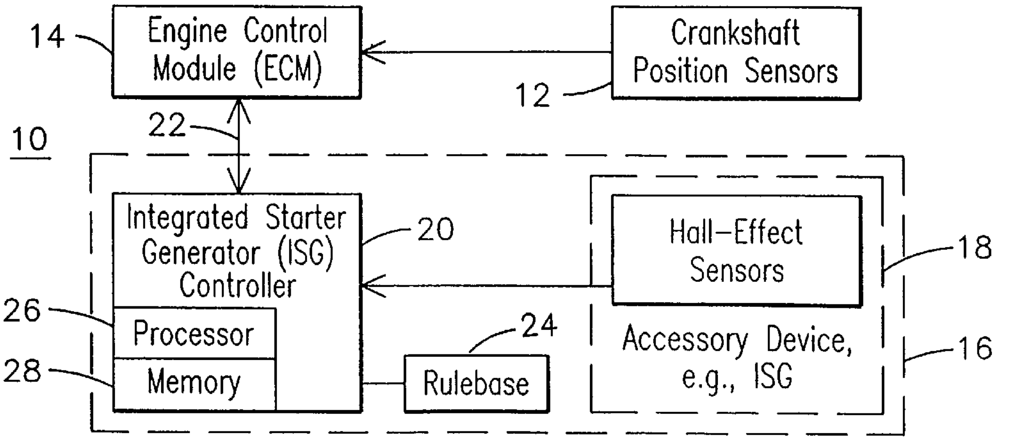
FIG. 1 is a block diagram representation of an exemplary engine control system embodying aspects of the present invention.

FIG. 1 illustrates a block diagram representation of an exemplary embodiment of an engine control system 10 embodying aspects of the present invention. As illustrated in FIG. 1, one or more standard crankshaft position sensors 12 provide respective signals indicative of crankshaft position to an engine control module (ECM) 14. In one exemplary embodiment, an Integrated Starter Generator (ISG) subsystem 16, part of the propulsion system of a land-based vehicle, includes an ISG device 18, such as a permanent magnet machine, that uses one or more sensor devices, such as Hall, or magneto-resistive sensors, that provide respective signals indicative of rotor position of the ISG device to an ISG controller 20. As illustrated in FIG. 1, data communication may be provided between ECM 14 and ISG controller 20 through a suitable data bus interface 22, such as serial data bus. Thus, in one exemplary embodiment, the ISG device comprises one example of an accessory device that includes accurate sensor devices for sensing rotor position that may be processed for determining crankshaft position prior to a cranking event.

If the ECM was able to know the at-rest position of the crankshaft prior to cranking, then fuel and spark firing could be provided to the appropriate cylinders upon initial cranking of the engine. Under this scenario, ECM 14 would be able to appropriately select the specific cylinders undergoing compression to receive fuel, rather than commanding delivery of fuel to all the cylinders during cranking, as is commonly done in techniques prior to the present invention. Thus, if the ECM was able to know the at-rest position of the crankshaft prior to cranking, fuel would not be wasted on the cylinders not requiring compression, spark firing would be accurately provided to the appropriate cylinders, and combustion would occur upon the first compression, rather than having to wait until engine speed reaches at least about 50 RPM or more. The result is that engine cranking time would be significantly reduced, and fuel economy and emissions would be improved at start-up.

As will be appreciated by those skilled in the art, Hall-effect or magneto-resistive position sensors do not need to be in motion to provide position information. The inventors of the present invention innovatively recognized that Hall-effect sensors (or equivalent), such as may be available on an accessory of the propulsion system, could be advantageously used to allow the ECM to determine the crankshaft position at-rest. As shown at FIG. 1, a rulebase 24 is provided for relating angular travel of the rotor in the accessory device to crankshaft angular travel. As suggested above, one or more rotor position sensors may be used for sensing angular travel of the rotor in the accessory device upon issuance of the engine shutdown command until the engine reaches a resting position. A processor 26 is configured to access the rulebase 24 to relate the value of the angular travel of the rotor in the accessory device to crankshaft angular travel and provide an incremental crankshaft angular travel relative to the initial crankshaft position at engine shutdown. Processor 26 is further configured to calculate crankshaft position at the resting position based upon the initial crankshaft position plus the incremental crankshaft angular travel based on the angular travel of the rotor in the accessory device. Memory 28 allows for storing the calculated crankshaft position corresponding to the resting position. Engine control module 20 is configured to retrieve the stored crankshaft position corresponding to the resting position upon issuance of an engine re-start command, and provide quick and accurate engine control regardless of any dead-band in the crankshaft position sensor during low engine speeds.

Figure 2:
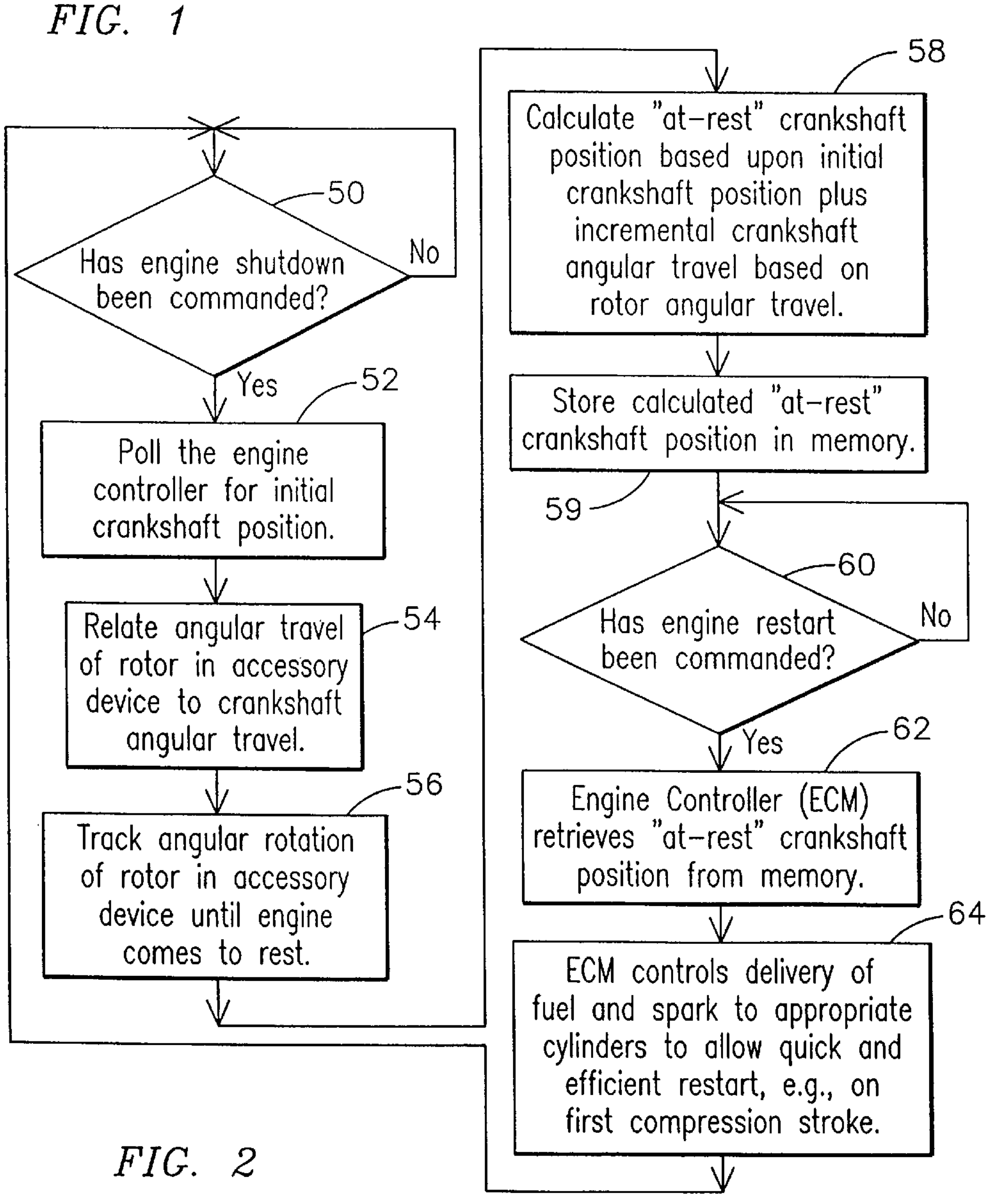
FIG. 2 is flow chart depicting exemplary actions that may be performed by the engine control system of FIG. 1.

In one exemplary implementation, as illustrated in the flow chart of FIG. 2, "Engine At-Rest Position Sensing and Control" could be implemented as follows: As shown at block 52, upon the engine being commanded to shutdown at block 50, the ISG controller would poll the ECM to determine an initial crankshaft position. As suggested above, the ECM normally determines the position of the crankshaft based on the standard crankshaft position sensors 12 (FIG. 1) located on the crankshaft. As illustrated at block 54, at engine shutdown, the ISG controller would be configured to relate angular travel of the rotor in the accessory device to crankshaft angular travel. Then, as represented at block 56, as the engine decelerates, a processor 26 (FIG. 1) in the ISG controller would track angular travel of the rotor using the signals provided by the Hall-effect sensors until the engine is completely at rest. The at-rest crankshaft position would now be calculated by processor 26 based upon the initial crankshaft position plus the incremental crankshaft angular travel based on the angular travel of the rotor in the accessory device. For example, the pulley ratio of the crankshaft and the rotor of the ISG device would be known and this would allow correlating angular rotation of the rotor to angular rotation of the crankshaft. For example, a degrees of rotor travel may correspond to D degrees of crankshaft angular travel. A rulebase 24 (FIG. 1) may comprise a mathematical relationship or a look-up table for correlating angular rotation of the rotor to angular rotation of the crankshaft. As will be appreciated by those skilled in the art, the crankshaft and the ISG device typically are mechanically linked to one another by an accessory belt (not shown). The computed value of at-rest crankshaft position would be stored in a non-volatile memory 28 (FIG. 1), such as EEPROM, flash memory, etc., for use when a new cranking event occurs. As represented by blocks 62 and 64, when an engine restart is commanded, as shown at block 60, the ECM would retrieve the initial crankshaft position from the non-volatile memory in the ISG controller, and ignition can occur on the first compression stroke, with the aforementioned improvements in starting time, fuel economy and emissions.

As suggested above, one exemplary embodiment of the above-described technique may be implemented in an ISG subsystem. The ISG subsystem allows the vehicle alternator to be operated in motoring mode for cranking and starting the engine (in addition to its normal generating mode). In general, an accurate position of the alternator rotor is generally required in the ISG subsystem in order to provide the required commutation for deriving the appropriate phase currents for motoring. Thus, Hall-effect sensors are typically provided with the alternator. Since these Hall-effect sensors are already part of the ISG subsystem, the ISG lends itself to the determination of the "Engine At-Rest Position Sensing and Control" technique in accordance with aspects of the present invention.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for determining angular crankshaft position prior to a cranking event of an internal combustion engine, the method comprising:

upon issuance of an engine shutdown command, determining an initial crankshaft position based on a crankshaft position sensor;

providing a rulebase for relating angular travel of a rotor in an accessory device to crankshaft angular travel;

sensing angular travel of the rotor in the accessory device since issuance of the engine shutdown command until the engine reaches a resting position;

accessing the rulebase to relate the value of the angular travel of the rotor in the accessory device to crankshaft angular travel and provide an incremental crankshaft angular travel relative to the initial crankshaft position at engine shutdown;

calculating crankshaft position at the resting position based upon the initial crankshaft position plus the incremental crankshaft angular travel based on the angular travel of the rotor in the accessory device;

storing the calculated crankshaft position corresponding to the resting position; and upon issuance of an engine re-start command, retrieving the stored crankshaft position corresponding to the resting position and provide quick and accurate engine control regardless of any dead-band in the crankshaft position sensor during low engine speeds.

2. The method of claim 1 wherein the accessory device comprises an integrated starter/generator device.

3. The method of claim 1 wherein the integrated starter/generator device comprises a permanent magnet machine.

4. The method of claim 1 wherein the sensing of rotor position comprises providing a sensor selected from the group consisting of a Hall-effect sensor, and a magneto-resistive sensor.

5. A control system for determining angular crankshaft position prior to a cranking event of an internal combustion engine, the controller comprising:

a crankshaft position sensor configured to provide an initial crankshaft position upon issuance of an engine shutdown command;

a rulebase for relating angular travel of a rotor in an accessory device to crankshaft angular travel;

a rotor position sensor for sensing angular travel of the rotor in the accessory device since issuance of the engine shutdown command until the engine reaches a resting position;

a processor configured to access the rulebase to relate the value of the angular travel of the rotor in the accessory device to crankshaft angular travel and provide an incremental crankshaft angular travel relative to the initial crankshaft position at engine shutdown, the processor further configured to calculate crankshaft position at the resting position based upon the initial crankshaft position plus the incremental crankshaft angular travel based on the angular travel of the rotor in the accessory device;

memory for storing the calculated crankshaft position corresponding to the resting position; and an engine control module configured to retrieve the stored crankshaft position corresponding to the resting position upon issuance of an engine re-start command, and provide quick and accurate engine control regardless of any dead-band in the crankshaft position sensor during low engine speeds.

6. The control system of claim 5 wherein the accessory device comprises an integrated starter/generator device.

7. The control system of claim 5 wherein the integrated starter/generator device comprises a permanent magnet machine.

8. The control system of claim 5 wherein the rotor position sensor is selected from the group consisting of a Hall-effect sensor and a magneto-resistive sensor.

9. A computer-readable medium including instructions for causing a computer to determine angular crankshaft position prior to a cranking event of an internal combustion engine by:

upon issuance of an engine shutdown command, determining an initial crankshaft position based on a crankshaft position sensor;

sensing angular travel of a rotor in an accessory device since issuance of the engine shutdown command until the engine reaches a resting position;

accessing a rulebase configured to relate the value of the angular travel of the rotor in the accessory device to crankshaft angular travel and provide an incremental crankshaft angular travel relative to the initial crankshaft position at engine shutdown;

calculating crankshaft position at the resting position based upon the initial crankshaft position plus the incremental crankshaft angular travel based on the angular travel of the rotor in the accessory device;

storing the calculated crankshaft position corresponding to the resting position; and upon issuance of an engine re-start command, retrieving the stored crankshaft position corresponding to the resting position and provide quick and accurate engine control regardless of any dead-band in the crankshaft position sensor during low engine speeds.

* * * * *